United States Patent
Louzoun et al.

(10) Patent No.: US 10,120,706 B2
(45) Date of Patent: *Nov. 6, 2018

(54) TECHNIQUES TO MIGRATE A VIRTUAL MACHINE

(71) Applicant: Intel Corporation, Santa Clara, CA (US)

(72) Inventors: Eliel Louzoun, Jerusalem (IL); Mickey Gutman, Zichron-Yaacov (IL); Gregory Cummings, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/717,515

(22) Filed: May 20, 2015

(65) Prior Publication Data

US 2015/0254095 A1    Sep. 10, 2015

Related U.S. Application Data

(63) Continuation of application No. 14/097,910, filed on Dec. 5, 2013, now Pat. No. 9,088,590, which is a
(Continued)

(51) Int. Cl.
*G06F 15/167* (2006.01)
*G06F 15/16* (2006.01)
(Continued)

(52) U.S. Cl.
CPC ........ *G06F 9/45558* (2013.01); *G06F 15/167* (2013.01); *H04L 67/10* (2013.01);
(Continued)

(58) Field of Classification Search
CPC ..... H04L 67/10; H04L 67/1095; H04L 67/34; H04L 69/162; H04L 49/9042;
(Continued)

(56) References Cited

U.S. PATENT DOCUMENTS 6,434,620 B1    8/2002   Boucher et al.
6,650,640 B1 *  11/2003  Muller .................. H04L 49/90
                                                        370/392
(Continued)

OTHER PUBLICATIONS

VMotion, "Migrate Virtual Machines with Zero Downtime", pp. 1-8. retrieved on May 2, 2016 <web.archive.org/web/20060816015717/www.vmware.com/products/vi/vc/vmotion.html>.*
(Continued)

*Primary Examiner* — Oleg Korsak
*Assistant Examiner* — Feliciano Mejia
(74) *Attorney, Agent, or Firm* — Barnes & Thornburg LLP

(57) ABSTRACT

Techniques are described that can be used to enable a transfer of an operating system from one machine to another. The transfer permits the operating system to be available to the target machine at buffers that are accessible to one or more application or other logic. In some implementations, information related to an operating system migration is stored in a buffer that is accessible to an application that is to use the information and thereby avoids a copy of such information from an intermediate buffer to an application buffer.

25 Claims, 4 Drawing Sheets

Related U.S. Application Data continuation of application No. 11/536,175, filed on Sep. 28, 2006, now Pat. No. 8,621,030.

(51) Int. Cl.
*G06F 9/455* (2018.01)
*H04L 29/08* (2006.01)
*H04L 29/06* (2006.01)

(52) U.S. Cl.
CPC .......... *H04L 67/1095* (2013.01); *H04L 67/34* (2013.01); *H04L 69/16* (2013.01); *H04L 69/161* (2013.01); *H04L 69/162* (2013.01); *G06F 2009/4557* (2013.01); *G06F 2009/45595* (2013.01)

(58) Field of Classification Search
CPC ... H04L 49/901; H04L 47/30; G06F 9/95558; G06F 15/167; G06F 2009/45583; G06F 9/45558; G06F 9/544
USPC .................. 709/201, 212, 216–217
See application file for complete search history.

(56) References Cited

U.S. PATENT DOCUMENTS

| | | |
|---|---|---|
| 6,996,070 B2 | 2/2006 | Starr et al. |
| 7,721,299 B2 | 5/2010 | van Riel |
| 2003/0165160 A1 | 9/2003 | Minami et al. |
| 2006/0083246 A1* | 4/2006 | Minami ................ G06F 13/128 370/395.31 |

OTHER PUBLICATIONS

Recio, R., P. Culley, D. Garcia, and J. Hilland. "An RDMA Protocol Specification (Version 1.0)." Draft-recio-iwarp-rdmap-v1.0. published., Oct. 21, 2002. Web. Oct. 29, 2016 <http://www.rdmaconsortium.org/home/draft-recio-iwarp-rdmap-v1.0.pdf> hereinafter referred to as RDMAv1.*

Huang et al., "High Performance Virtual Machine Migration With RDMA Over Modern Interconnects", Computer Science and Engineering, the Ohio State University, 2007, 10 pages.

Jason Nieh et al., "Examining VMware", Dr. Dobb's Journal, Aug. 2000, 9 pages.

Hemal Shah ET et al., "Direct Data Placement over Reliable Transports (Version 1.0)", draft-shah-iwarp-ddp-v1.0, Oct. 2002, pp. 1-35.

Alex Williamson, "Xen and the Art of Open Source Itanium Virtualization", HP Open Source and Linux Org., Hewlett-Packard Development Company, L.P., 2006, pp. 1-39.

VMotion, "Migrate Virtual Machines with Zero Downtime", pp. 1-8. retrieved on Aug. 16, 2006 <web.archive.org/web/20060816015717/www.vmware.com/products/vi/vc/vmotion.html>.

* cited by examiner

TECHNIQUES TO MIGRATE A VIRTUAL MACHINE

CROSS REFERENCE TO RELATED APPLICATION

This application is a continuation of U.S. patent application Ser. No. 14/097,910, filed Dec. 5, 2013, entitled, "TECHNIQUES TO COPY AN OPERATING SYSTEM," which is a continuation of U.S. patent application Ser. No. 11/536,175 filed Sep. 28, 2006, entitled, "TECHNIQUES TO COPY AN OPERATING SYSTEM," now patented as U.S. Pat. No. 8,621,030, issued on Dec. 31, 2013.

FIELD

The subject matter disclosed herein relates to techniques to copy an operating system from one machine to another machine.

RELATED ART

Virtualization is a well-known technique to share hardware resources between several operating systems. Each operating system "believes" that it has complete control over its hardware environment and is not aware that the hardware environment is shared. Virtualization has the capability to move an operating system (OS) from one physical computer node to another node without the operating system being aware and with minimal interruption of the operating system. This operation is known as Virtual Machine (VM) migration. Examples of applications that perform virtual OS migration include VM Relocation from XenSource Inc. and VMotion and LiveMotion from VMware Inc. It is desirable to complete operating system migration in a minimum amount of time so that interrupt to the operating system is minimized.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some embodiments provide techniques to use TCP/IP compliant network protocol units for migrating an operating system from one machine to another machine. In some embodiments, information related to an operating system migration is stored in a buffer at a recipient computer that is accessible to an application that is to use the information. Thereby, copying such information from an intermediate buffer to an application buffer may be avoided.

Figure 1:
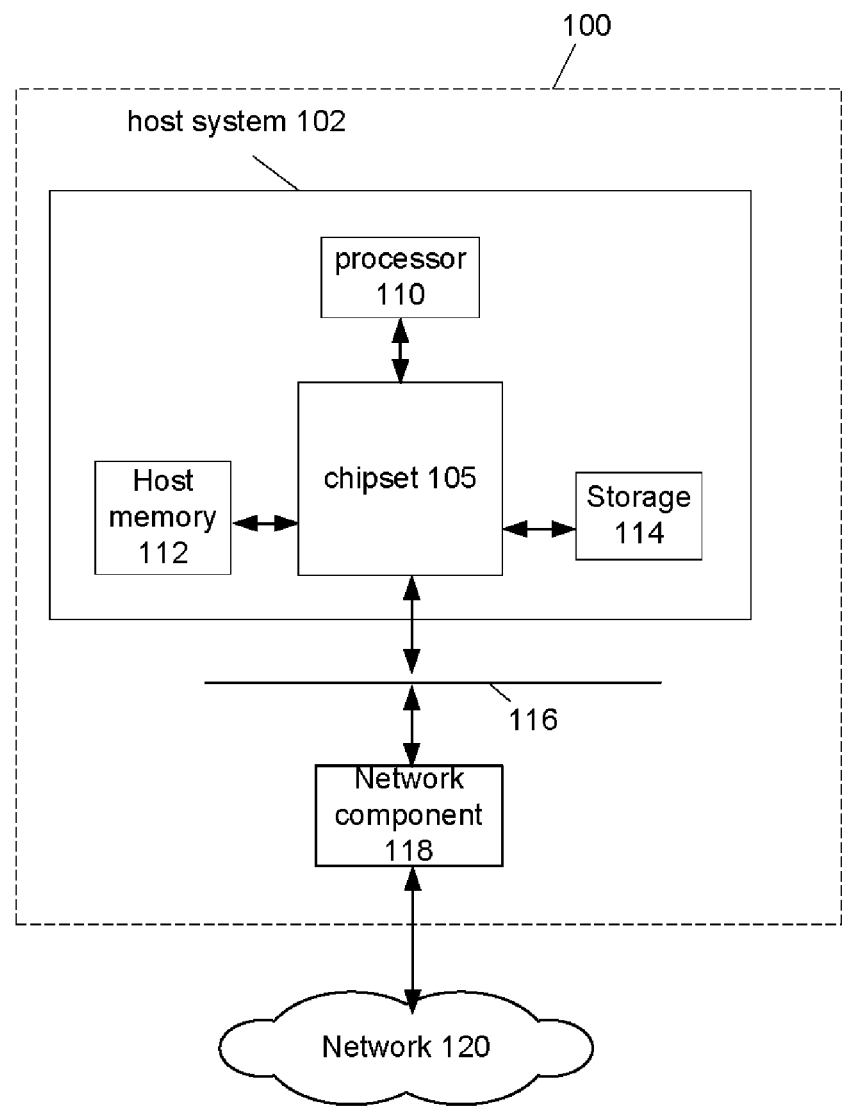
FIG. 1 depicts an example system embodiment in accordance with some embodiments of the present invention.

FIG. 1 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance at least with any of the following protocols: Small Computer Systems Interface (SCSI), Fibre Channel (FC), and/or Serial Advanced Technology Attachment (S-ATA).

In some embodiments, chipset 105 may include data mover logic (not depicted) capable to perform transfers of information within host system 102 or between host system 102 and network component 118. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements, which may result in the host processor running at much slower speeds. A data mover may include, for example, a direct memory access (DMA) engine. In some embodiments, data mover may be implemented as part of processor 110, although other components of computer system 100 may include the data mover. In some embodiments, data mover may be implemented as part of chipset 105.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up synchronous DRAM (SDRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard. As used herein, a "network protocol unit" may include any packet or frame or other format of information with a header and payload portions formed in accordance with any protocol specification.

Some embodiments provide operating system migration (OM) from another machine to host system 102. The another machine may transfer a copy of an operating system to host system 102 using network protocol units compliant with the TCP/IP protocol, although any other protocol may be used. In some embodiments, information related to an operating system migration is stored in a buffer in host memory 112 that is accessible to an application that is to use the information and thereby avoids a copy of such information from an intermediate buffer to an application buffer.

Figure 2:
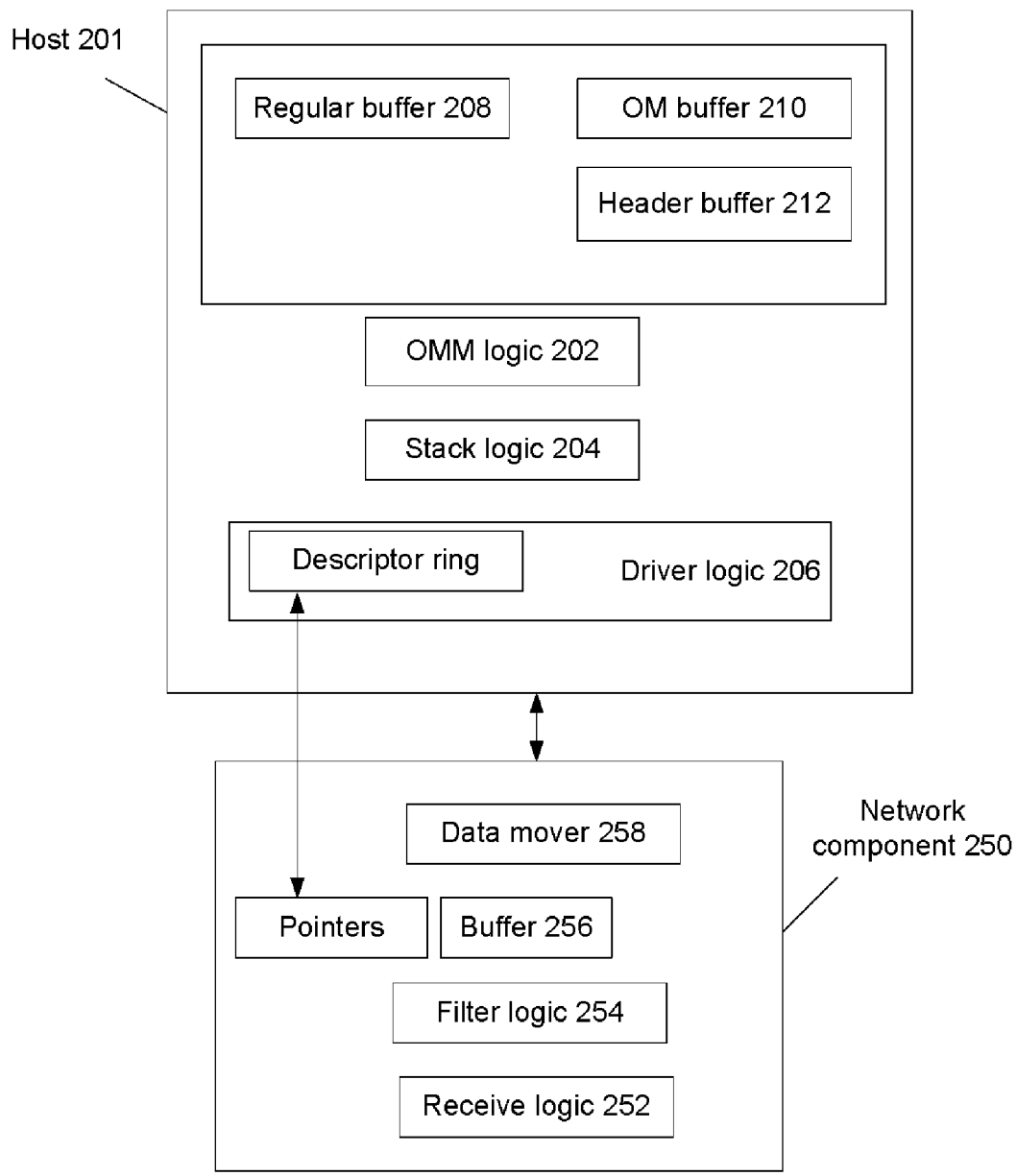
FIG. 2 depicts an example of interactive elements in accordance with some embodiments of the present invention.

FIG. 2 depicts an example of elements that can be used in some embodiments of the present invention in the course of migration of an operating system from one computer to another. For example, an information technology manager may request that a virtual operating system migration occur so that host 201 may use the operating system executed by another computer. For example, the manager may request the virtual operating system migration in order to perform load balancing among computers or to continue use of an operating system prior to shut down of another computer that runs the operating system. The manager may request that the transmitter computer initiate a virtual operating system migration to host 201. In some embodiments, host 201 may include at least OS migration monitor (OMM) logic 202, stack logic 204, driver logic 206, regular buffer 208, OM buffer 210, and header buffer 212. Host 201 may include other logic (not depicted) such as but not limited to a processor, memory device, and storage device.

OMM logic 202 may be capable of managing copying of an image of an operating system (OS) or other information relating to a migration of an OS from another computer to host 201. OMM logic 202 may in part use a virtual OS migration capability inside a Virtual Machine Monitor (VMM) layer of an operating system executed by host 201.

For example, a transmit VMM logic (or other logic) used by another computer may communicate with OMM logic 202 to open a TCP/IP socket used to copy the operating system image to host 201. The socket may be a 4 tuple that includes an IP source address, IP destination address, TCP port receive, and TCP transmit port, although other types of information may be used to identify network protocol units involved in an operating system migration. OMM logic 202 may assign OM buffer 210 and header buffer 212 for network protocol units that include information related to migration of a guest OS to host 201. OMM logic 202 may provide the socket to driver 206 to indicate that network protocol units within the socket are to be stored in OM buffer 210 and header buffer 212.

OMM logic 202 may provide to driver logic 206 a descriptor for each OM buffer. Each descriptor describes a target buffer location and an expected TCP sequence number for a network protocol unit to be stored in an OM buffer. The expected TCP sequence number may be determined by the driver from an initial sequence number. OM buffers can be used to store payloads of received network protocol units. OMM logic 202 (or other logic) may identify regular buffers at least to store headers and/or payloads of traffic that does not carry information relating to an OM or that are within the OM socket but do not have an expected sequence number.

Driver logic 206 may be a driver for network component 250. Driver logic 206 may be capable to initialize network component 250 and permit other logic to interface with network component 250. Driver logic 206 may assign a ring of one or more descriptor dedicated to the OM socket. The ring may be stored in host memory. Pointers to the start and end of the ring may be provided to network component 250. Network protocol units within the OM socket are to be stored in buffers specified in the ring. For example, assigning a ring may include defining a base and size of the ring as well as tail and header pointers. A single ring may be used to point to buffers to store headers and payloads of received network protocol units. Other rings may be used to specify buffer locations for other types of received network protocol units. For example, a ring may be assigned to convey destination buffers for network protocol units not involved in an OM or network protocol units that are involved in an OM but do not have an expected sequence number.

Driver logic 206 may identify OM buffers to network component 250 using the ring dedicated to the OM. For example, the network component may start using the buffers specified in the ring for the OM to store received network protocol units when the tail pointer value is increased so that the header pointer value does not match tail pointer value. Target buffers may be provided to network component 250 until the OM socket is closed. For example, closing the OM socket may be achieved when a network protocol unit in the OM socket indicates the OM socket is to be closed such as by indication of "FIN" using the TCP protocol.

For example, an interrupt may indicate receipt of one or more network protocol unit that carries information pertinent to an OM. The network protocol unit that carries information pertinent to an OM may be compliant, for example, at least with the TCP/IP protocol. Upon reception of such an interrupt, driver logic 206 may check if the payload was placed in an OM buffer or a regular buffer. Driver logic 206 may indicate receipt of one or more header from one or more network protocol unit to stack 204.

Stack logic 204 may perform protocol processing at least of headers of received network protocol units in compliance with the TCP/IP protocol. For example, the TCP/IP protocol is described at least in the publication entitled "Transmission Control Protocol: DARPA Internet Program Protocol Specification," prepared for the Defense Advanced Projects Research Agency (RFC 793, published September 1981) as well as revisions thereof. After stack logic 204 processes a header and the header is approved, stack logic 204 may inform OMM logic 202 that the payload associated with the approved header is stored in the OM buffer and is available for use.

Host memory of host 201 may include regular buffer 208, OM buffer 210, and header buffer 212. Regular buffer 208 may store network protocol units not involved in an OM or network protocol units that are involved in an OM but do not have an expected sequence number. Other types of network protocol units may be stored in regular buffer 208.

OM buffer 210 may store payloads of network protocol units involved in an OM to host 201 that have an expected sequence number. Network component 250 may store payloads of received network protocol units into OM buffer 210. Although not a necessary feature of any embodiment, use of OM buffer 210 may avoid a sequence of copying a payload to a regular buffer and subsequently copying the payload to an application buffer. OM buffer 210 may be directly accessible by an application or other logic that is to use the migrated operating system.

Header buffer 212 may store headers of received network protocol units stored into OM buffer 210. Network component 250 may store such headers into header buffer 212.

In some embodiments, network component 250 may include a transceiver logic 252, filter logic 254, buffer 256, and data mover 258. Transceiver logic 252 may be capable to receive network protocol units through a physical medium and transmit network protocol units through a physical medium. The physical medium may be a coaxial cable, wire-line, fiber optic cable, or other signal propagation medium. Alternatively or in addition, transceiver logic 252 may be capable to receive and transmit signals using wireless techniques. For example, transceiver logic 252 may receive and transmit network protocol units in conformance with applicable protocols such as Ethernet as described in IEEE Standard 802.3 (2002) and revisions thereof, although other protocols may be used. Transceiver logic 252 may be used to perform media access control operations as prescribed by applicable protocols such as Ethernet, although other protocols may be used, as well as other protocol-related processing.

Filter logic 254 may determine whether a received network protocol unit carries information relevant to an OM to host 201. Various techniques can be used to determine whether the received network protocol unit carries information relevant to an OM. For example, network protocol units relevant to an OM may be identified by having 4-tuples that match the socket for the OM. For example, host 201 may identify one or more socket of network protocol units that carry information relevant to an OM. Each network protocol unit relevant to an OM may be directed to be stored in an OM buffer identified in the descriptor ring associated with the OM socket provided that the network protocol unit has a sequence number associated with the OM buffer. Network protocol units not involved in an OM or network protocol units that are involved in an OM but do not have an expected sequence number may be stored in regular buffer 208.

Buffer 256 may store received network protocol units prior to transfer to host 201. Data mover logic 258 may transfer at least network protocol units for storage in host 201. Data mover logic 258 may store payloads of received network protocol units into appropriate buffers in host memory. For example, a payload of a network protocol unit that carries information relevant to an OM and which has an expected sequence number is stored to an OM buffer associated with the expected sequence number.

In response to reception of a network protocol unit matching the socket and having an expected sequence number, the payload of the network protocol unit may be stored into the OM buffer associated with the sequence number of such network protocol unit and the expected sequence number may be increased by the payload size of such network protocol unit. In some embodiments, the sequence number is not increased until a segment having the expected sequence number is received.

The headers of network protocol units that carry information relevant to an OM may be stored in header buffer 212. The location of the header buffer may be specified in the descriptor ring.

If the received network protocol unit is not associated with an OM, the received network protocol unit may be stored into a regular buffer. If the received network protocol unit does not have an expected sequence number, even though it is in the socket associated with the OM, the received network protocol unit may be stored into a regular buffer. For example, in some cases, TCP/IP segments may be received by a network component out of order. An out-of-order TCP/IP segment may have a sequence number that is unexpected. Each out-of-order TCP/IP segment may be stored in a regular buffer. However, in some embodiments, an out-of-order TCP/IP segment may be stored in OM buffer 210 and header buffer 212. An indication (such as but not limited to an interrupt) may be provided to the driver that a network protocol unit was stored into a buffer in host memory.

Figure 3:
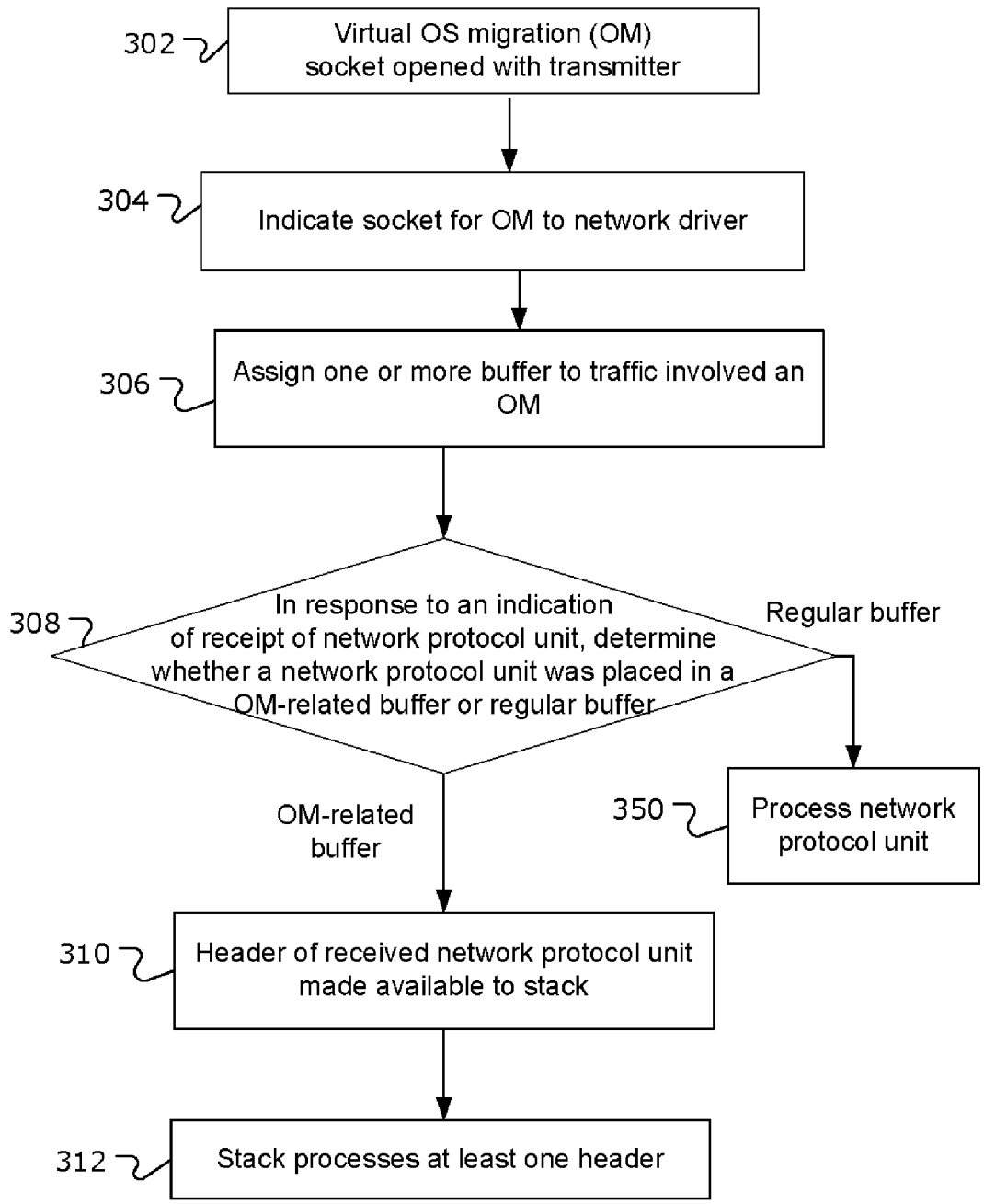
FIGS. 3 and 4 depict example flow diagrams that can be used in operating system migration in accordance with some embodiments of the present invention.

FIG. 3 depicts an example flow diagram that can be used to enable receipt of network protocol units relevant to an OM in accordance with some embodiments of the present invention. In block 302, a target computer and a transmitter may establish a TCP/IP socket over which an OM may take place to copy an operating system image to the target machine. The socket may be a 4-tuple that includes an IP source address, IP destination address, TCP port receive, and TCP transmit port, although other types of sockets may be used.

In block 304, logic responsible for managing an OM may indicate to the driver a socket for the OM. The driver may be associated with a network component capable to receive network protocol units.

In block 306, logic responsible for managing an OM may assign one or more buffer for the network protocol units involved in the OM. In some embodiments, each network protocol unit in the OM has an allocated buffer for the payload and a separate allocated buffer for the header. In some embodiments, TCP/IP compliant network protocol units are used to perform the OM. The logic responsible for managing the OM may provide to driver logic descriptors for each assigned buffer. Each descriptor may describe a target buffer location and an expected TCP sequence number for a network protocol unit to be stored in the buffer. Sequence numbers of the buffers may be expected to be contiguous. The logic responsible for managing an OM may identify regular buffers to store headers and/or payloads of traffic not used in an OM. Driver logic may provide the buffers to network component using the ring dedicated to the OM. Target buffers may be provided to the network component until the socket for the OM is closed. As long as the OM socket is open, the logic responsible for managing the OM may continue to assign buffers and associated sequence numbers to network protocol units in the OM and the driver transfer buffer assignments to the network component.

In block 308, in response to indication of receipt of a network protocol unit, a determination may be made whether a network protocol unit was placed in an OM-related buffer or regular buffer. The indication may be in the form of an interrupt to driver logic. The indication may be provided from a network component logic prior to, after, or at approximately the same time as a network protocol unit received from a network is stored into a buffer in host memory. Network protocol units that carry information related to an OM may be stored in OM-related buffers. A network protocol unit that does not carry information related to an OM or has a sequence number other than that expected by the network component may be stored in other buffers. Block 310 may follow block 308 in order to process one or more network protocol unit stored in an OM-related buffer. Block 350 may follow block 308 in order to process one or more network protocol unit stored in a regular buffer.

In block 310, a header of a received network protocol unit that carries information related to the OM may be made available to a stack logic. The header may be stored in a dedicated header buffer.

In block 312, the stack logic may process at least one header. After the stack logic processes a header and the header passes inspection, the stack logic may inform OMM logic that the payload associated with the approved header is stored in the OM buffer and is available to OMM logic.

In block 350, processing may take place on network protocol units stored in regular buffers. Relevant protocol processing may take place.

Figure 4:
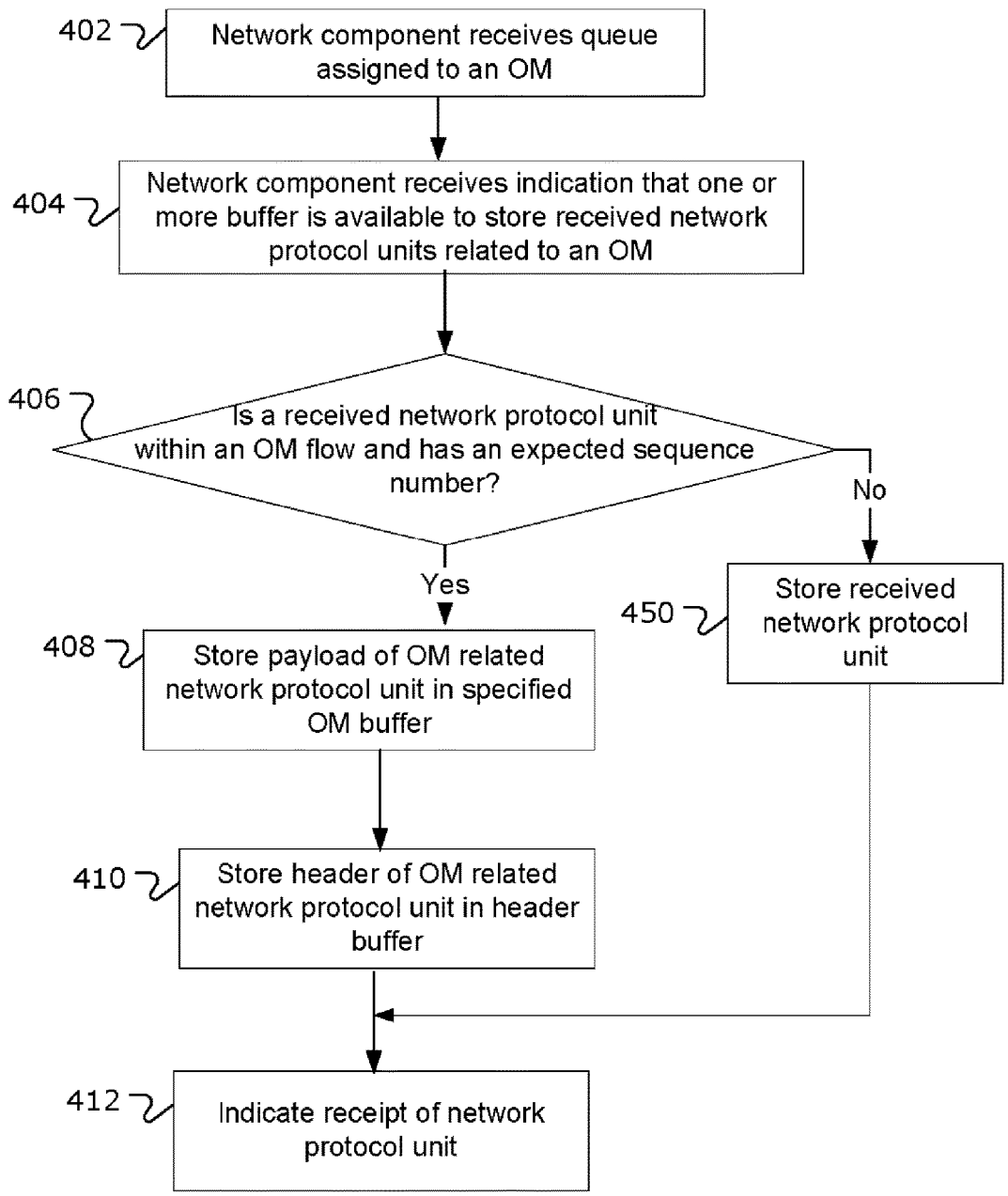

FIG. 4 depicts an example flow diagram in accordance with some embodiments of the present invention that can be used in connection with an OM. In block 402, the network component may receive a queue assigned to an OM. The queue may be a descriptor ring where each descriptor describes a buffer in which to store a header and payload of network protocol units involved in an OM as well as a sequence number associated with each buffer.

In block 404, the network component may receive an indication that one or more buffer is available to store received network protocol units involved in an OM.

In block 406, the network component may determine whether a received network protocol unit is related to an OM and has an expected sequence number. In some embodiments, TCP/IP compliant network protocol units are used to perform the OM. For example, the determination of whether a received network protocol unit is within an OM may be made based on whether a socket of the received network protocol unit matches the OM socket. A sequence number is associated with each buffer. If the received network protocol unit is related to an OM and has an expected sequence number, block 408 may follow. If the received network protocol unit is not related to an OM or does not have an expected sequence number, block 450 may follow.

In block 408, the network component may store the network protocol unit in the OM-related buffer in host memory for the sequence number. The expected sequence number may be the sequence number of an available OM buffer that is to be used next and identified by the descriptor ring. The expected sequence number of the next received network protocol unit may be increased by the payload size of the most recently received network protocol unit. Increasing the sequence number may be performed in order to verify the network protocol units are in order.

In block 410, the header of the received network protocol unit may be stored into a header buffer associated with the OM. In addition, the header buffer may be assigned to a particular sequence number.

In block 412, the network component may provide an indication to the driver that a network protocol unit was stored in the host memory at a particular buffer.

In block 450, the network component may store the received network protocol unit in a regular buffer in host memory. The received network protocol unit may be a network protocol unit that do not carry information related to an OM and/or has an unexpected sequence number. Block 412 may follow block 450.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. At least one non-transitory computer readable storage medium storing instructions thereon that when executed by one or more processors cause the one or more processors to:
   assign at least one buffer to store a portion of a received network protocol unit;
   determine whether a received network protocol unit carries information for a migration of a virtual machine;
   cause transfer of a portion of a received network protocol unit to the assigned at least one buffer in response to a determination that the received network protocol unit carries information for a migration of a virtual machine;
   provide availability to logic of at least the portion of the received network protocol unit directly from the assigned at least one buffer, wherein the logic is to access the at least the portion of the received network protocol unit directly from the assigned at least one buffer, and without a copy of the at least the portion of the received network protocol unit from the assigned at least one buffer to another buffer, wherein
   the transferred portion carries information associated with a migration of a virtual machine and
   the logic comprises at least a virtual machine manager for managing migration of the virtual machine to its recipient.

2. The at least one non-transitory computer readable medium of claim 1, further comprising instructions stored thereon that when executed by one or more processors cause the one or more processors to:
   identify a TCP/IP socket associated with the migration of the virtual machine.

3. The at least one non-transitory computer readable medium of claim 2, wherein to determine whether a received network protocol unit carries information for a migration of a virtual machine, the instructions are to cause the one or more processors to determine whether a sequence number of the received network protocol unit matches an expected sequence number and the received network protocol unit is within the socket.

4. The at least one non-transitory computer readable medium of claim 1, wherein to assign, the instructions are to cause the one or more processors to transfer identification of the at least one buffer to a network component.

5. The at least one non-transitory computer readable medium of claim 1, further comprising instructions stored thereon that when executed by one or more processors cause the one or more processors to:
   assign a second buffer to store a portion of a received network protocol unit and
   selectively transfer a portion of a second received network protocol unit to the assigned second buffer in response to a determination that the second received network protocol unit is not associated with a virtual machine migration.

6. The at least one non-transitory computer readable medium of claim 1, wherein the at least the portion of the received network protocol unit is not copied from the assigned at least one buffer prior to the access by the logic.

7. The at least one non-transitory computer readable medium of claim 1, wherein the portion of the received network protocol unit transferred to the assigned at least one buffer is not copied to another buffer prior to access by the logic.

8. The at least one non-transitory computer readable medium of claim 1, wherein a network component is to transfer the portion of the received network protocol unit to the assigned at least one buffer and the portion of the received network protocol unit transferred to the assigned at least one buffer is not copied to another buffer prior to access by the logic.

9. A computer-implemented method, the method comprising:
   assigning at least one buffer to store a portion of a received network protocol unit;
   determining whether a received network protocol unit carries information for a migration of a virtual machine;
   transferring a portion of a received network protocol unit to the assigned at least one buffer in response to a determination that the received network protocol unit carries information for a migration of a virtual machine;
   providing availability to logic of at least the portion of the received network protocol unit directly from the assigned at least one buffer, wherein the logic is to access the at least the portion of the received network protocol unit directly from the assigned at least one buffer, and without a copy of the at least the portion of the received network protocol unit from the assigned at least one buffer to another buffer, wherein
   the transferred portion carries information associated with a migration of a virtual machine and
   the logic comprising at least a virtual machine manager for managing migration of the virtual machine to its recipient.

10. The method of claim 9, further comprising:
    identifying a TCP/IP socket associated with the migration of the virtual machine.

11. The method of claim 10, wherein the determining whether a received network protocol unit carries information for a migration of a virtual machine comprises determining whether a sequence number of the received network protocol unit matches an expected sequence number and the received network protocol unit is within the socket.

12. The method of claim 9, wherein the assigning at least one buffer comprises transferring identification of the at least one buffer to a network component.

13. The method of claim 9, further comprising:
    assigning a second buffer to store a portion of a received network protocol unit and
    selectively transferring a portion of a second received network protocol unit to the second buffer in response to a determination that the second received network protocol unit is not associated with a migration of a virtual machine.

14. The method of claim 9, wherein:
    the at least the portion of the received network protocol unit is not copied from the assigned at least one buffer prior to the access by the logic.

15. The method of claim 9, wherein the portion of the received network protocol unit transferred to the assigned at least one buffer is not copied to another buffer prior to access by the logic.

16. The method of claim 9, further comprising:
    a network component transferring the portion of the received network protocol unit to the assigned at least one buffer, wherein the portion of the received network protocol unit transferred to the assigned at least one buffer is not copied to another buffer prior to access by the logic.

17. A system comprising:
a host system, the host system comprising at least one memory and a network component, the host system to:
assign at least one buffer to store a portion of a received network protocol unit;
determine whether a received network protocol unit carries information for a virtual machine migration;
cause transfer of a portion of a received network protocol unit to the assigned at least one buffer in response to a determination that the received network protocol unit carries information for a virtual machine migration, wherein
the network component is to store the portion of the received network protocol unit directly into the assigned at least one buffer,
the stored portion comprising information associated with a migration of a virtual machine,
a logic to access the stored portion of the received network protocol unit directly from the assigned at least one buffer, without a copy of the at least the portion of the received network protocol unit from the assigned at least one buffer to another buffer, the logic comprising at least a virtual machine manager to manage migration of the virtual machine to the host system, and
the stored portion of the received network protocol unit in the assigned at least one buffer is not copied to another buffer prior to its access by the logic.

18. The system of claim 17, wherein the host system is to: identify a TCP/IP socket associated with the virtual machine migration.

19. The system of claim 18, wherein to determine whether a received network protocol unit carries information for a virtual machine migration, the host system is to determine whether a sequence number of the received network protocol unit matches an expected sequence number and the received network protocol unit is within the socket.

20. The system of claim 17, wherein to assign, the host system is to transfer identification of the at least one buffer to the network component.

21. The system of claim 17, wherein the host system is to:
assign a second buffer to store a portion of a received network protocol unit and
selectively transfer a portion of a second received network protocol unit to the second buffer in response to a determination that the second received network protocol unit is not associated with a virtual machine migration.

22. The system of claim 17, further comprising a display communicatively coupled to the host system.

23. The at least one computer readable medium of claim 1, wherein the migration of the virtual machine comprises migration of a virtual operating system (OS).

24. The method of claim 9, wherein the migration of the virtual machine comprises migration of a virtual operating system (OS).

25. The system of claim 17, wherein the migration of the virtual machine comprises migration of a virtual operating system (OS).

* * * * *